United States Patent [19]

Morsbach et al.

[11] 4,090,720
[45] May 23, 1978

[54] EXPANDER SPRING FOR PISTON RINGS

[75] Inventors: Martin Morsbach; Paul Jöhren, both of Burscheid; Jürgen Weiss, Leverkusen, all of Germany

[73] Assignee: GOETZEWERKE Friedrich Goetze AG, Burscheid, Germany

[21] Appl. No.: 783,450

[22] Filed: Mar. 31, 1977

[30] Foreign Application Priority Data

Apr. 7, 1976 Germany .............................. 2615010

[51] Int. Cl.² .............................................. F16J 9/00
[52] U.S. Cl. .................................... 277/140; 267/1.5
[58] Field of Search ............... 277/139, 140, 141, 216; 267/1.5

[56] References Cited

U.S. PATENT DOCUMENTS

| 2,785,030 | 3/1957 | Olson | 277/140 |
| 2,789,022 | 4/1957 | Olson | 277/140 |
| 2,837,386 | 6/1958 | Mayfield | 277/139 |
| 2,859,079 | 11/1958 | Olson | 277/139 |

Primary Examiner—Robert I. Smith
Attorney, Agent, or Firm—Spencer & Kaye

[57] ABSTRACT

An expander spring for supporting an oil scraper ring in a groove of a piston is constituted by a sheet metal ring having an axis and forming an annular channel of generally U-shaped cross section. The channel has two side walls, forming, respectively, a radially inner and a radially outer, axially oriented side of the expander spring. The channel further has a base interconnecting the side walls and an open side opposite the base. A plurality of circumferentially distributed slots are provided in the side walls for increasing the resiliency of the expander spring in the circumferential direction, and a plurality of axially projecting support feet are carried by the free end of the radially inner side of the expander spring for supporting at least one oil scraper ring.

9 Claims, 6 Drawing Figures

EXPANDER SPRING FOR PISTON RINGS

BACKGROUND OF THE INVENTION

This invention relates to an expander spring for piston rings, particularly for lamina-shaped oil scraper rings and is formed of a cross-sectionally approximately U-shaped, annularly bent sheet metal strip which is rendered resilient by circumferentially distributed slots or similar cutouts and which, in the zone of at least one radial side, has axially projecting support feet for engaging at least one oil scraper ring.

For the radial biasing of oil scraper piston rings which are generally made of a bent steel strip, there are known a substantial mumber of expander spring structures which are formed of sheet metal strips of various cross-sectional configuration and are made resilient in the circumferential direction by means of slots or the like. Expander springs which are particularly easy to manufacture have an L or U-shaped cross section. Expander springs of L-shaped cross section are disclosed, for example, in U.S. Pat. No. 3,627,333 which have, when viewed axially, a very small height, so that upon application of a radial tensioning force, the spring undergoes significant distortion. Further, in such expander springs there are provided no oil discharge openings so that they are practically not adapted to be used with oil scraper rings. In contradistinction, expander springs having a U-shaped cross section are more advantageous in these respects. Particularly, for manufacturing reasons, the cross-sectional profile of expander springs has been arranged in such a manner that the U profile is open either outwardly towards the wall of the cylinder in which the piston works or inwardly towards the piston, as disclosed, for example, in U.S. Pat. No. 2,837,385 and German Pat. No. 1,475,713.

Expander springs of the above-outlined type serve not only for the radial biasing of the oil scraper rings, but they also must guide the oil scraper rings which, in most cases, are very thin in the axial direction. Thus, the expander springs must prevent tilting of the oil scraper rings in the gap between the expander spring and the piston.

Expander springs with U-shaped cross section do not fully satisfy the above requirement, since the free leg ends of the "U" do not have sufficient guiding properties. Although the expander spring disclosed in U.S. Pat. No. 3,191,947 has additional axial extensions at one of the leg ends for preventing an axial bending of the two leg ends of the "U" to one another, an expander spring having a box-like cross section resulting from such a structure is difficult to manufacture. Further, the lower leg itself of the expander spring is designed as the oil scraper and thus is exposed to a high degree of wear.

SUMMARY OF THE INVENTION

It is an object of the invention to provide an improved expander spring annulus of U-shaped cross section which is simple to manufacture and which satisfies the above-outlined requirements regarding a high expanding capacity, a sufficient oil discharge property, positive guidance as well as an axial biasing of the lamina-like oil scraper rings.

This object and others to become apparent as the specification progresses, are accomplished by the invention, according to which, briefly stated, the expander spring for supporting an oil scraper ring in a groove of a piston is constituted by a sheet metal ring having an axis and forming an annular channel of generally U-shaped cross section. The channel has two side walls, forming, respectively, a radially inner and a radially outer, axially oriented side of the expander spring. The channel further has a base interconnecting the side walls and an open side opposite the base. A plurality of circumferentially distributed slots are provided in the side walls for increasing the resiliency of the expander spring in the circumferential direction, and a plurality of axially projecting support feet are carried by the free end of the radially inner side of the expander spring for supporting at least one oil scraper ring.

The provision of the expander spring with an axially open U-shaped profile has the advantage that the tangential tension force is generated substantially by the elastic deformation of the radially extending base of the channel, while the axially oriented side walls of the channel serve for the radial and axial support of the oil scraper ring at both the inner and outer circumferences of the latter. The sheet metal strip which constitutes the expander spring, has, in a manner known by itself, radially oriented slots which alternatingly start from the outer and inner circumferences of the expander spring and which overlap in the base of the channel of U-shaped cross section. The radial slots thus subdivide the side walls of the channel into individual leg segments in the circumferential direction. According to a further advantageous feature of the invention, the radially outer leg segments are inclined towards the ring axis such that the free leg ends lie along a circle of smaller diameter than the portions close to the channel base. In this manner there is provided a resiliently yielding axial support of the oil scraper ring in the vicinity of the outer circumference thereof. In order to increase the contact area between the free leg ends and the radially outer leg segments with the scraper ring, the free leg ends are expediently angularly bent radially inwardly. According to a further feature of the invention, the radially inner leg segments formed by the slots have an S-shaped cross section so that the free leg ends, formed as oblique support feet, engage and support the oil scraper ring at its inner circumference both in the axial and in the radial direction.

In some instances an elastic centering of the expander spring within the piston ring groove is of advantage. For this purpose some of the radially inner leg segments extend farther towards the expander spring axis than the other leg segments. In this manner individual resilient tongues are provided which engage the base of the piston groove for the radial support of the expander spring.

In order to increase the scraping effect of the entire oil scraper ring assembly, a plurality of oil scraper rings may cooperate with the expander spring. For this purpose it is expedient to arrange a separate oil scraper ring on each radial side of the expander spring. Accordingly, a feature of the invention provides that the radial base of the expander spring has, in the vicinity of its inner circumference, axially outwardly (that is, away from the channel) extending projections which may support a second oil scraper ring. Such projections may be simply provided by bending tab-portions out of the plane of the sheet metal strip constituting the expander spring.

In accordance with a further feature of the invention, there is provided an expander spring with support feet for at least two oil scraper rings positioned in a piston groove, wherein the support feet for the upper oil scraper ring (oriented towards the combustion chamber defined by the cylinder in which the piston operates) lie along a circle of larger diameter than the support feet for the lower scraper ring (oriented towards the crank shaft connected to the piston). This permits a smaller radial wall thickness for the upper oil scraper ring. Thus, advantageously, because of its reduced resistance to bending, the upper oil scraper ring has a greater form-adaptability, so that it is capable of better conforming to any unevenness of the cylinder wall.

U.S. Pat. No. 2,107,241 discloses a piston ring having a cross-sectional shape approximating that discussed above in connection with the invention. It is noted, however, that a practically workable arrangement could be achieved only according to the invention, by providing not a piston ring but an expander spring with the cross section in question, and by utilizing such an expander spring in a piston groove for positioning at least one lamina-like oil scraper ring. The known compression and oil scraper piston ring has no resiliency in the circumferential direction and thus is relatively rigid in the radial direction. Further, the radial outer legs of the known piston ring gliding along the cylinder wall do not, particularly in case of additional pressing stresses exerted by the gaseous medium to be sealed, satisfy the requirements regarding wear resistance. Thus, piston rings of such a structure have heretofore not found practical application.

BRIEF DESCRIPTION OF THE DRAWINGS

FIG. 1b is a fragmentary perspective view of a component shown in FIG. 1a.

FIG. 2b is a fragmentary perspective view of a component shown in FIG. 2a.

FIG. 3b is a fragmentary perspective view of a component shown in FIG. 3a.

DESCRIPTION OF THE PREFERRED EMBODIMENTS

Figure 1A:
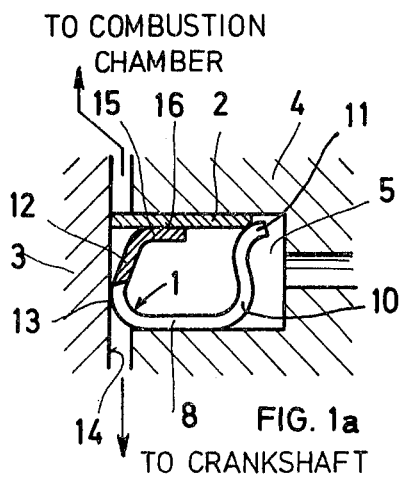
FIG. 1a is a cross-sectional view of an oil scraper ring assembly incorporating a preferred embodiment of the invention.

Turning now to FIG. 1a, the oil scraper ring assembly is shown in its installed state. The assembly is received in a circumferential groove 5 of a piston 4 operating in a cylinder 3 which defines, for example, a combustion chamber of an internal combustion engine.

Figure 1B:
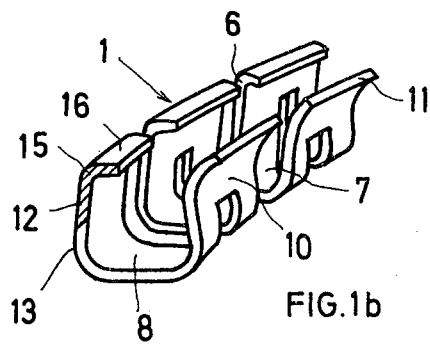

The oil scraper ring assembly has an expander spring 1 and a lamina-like oil scraper ring 2 oriented towards the combustion chamber. As may be observed in FIG. 1b, the expander spring 1 is a circularly bent sheet metal annulus shaped generally as a channel which has a U cross section and which thus has, relative to the ring axis, axially extending, radially inner and radially outer side walls as well as a radial base 8 interconnecting the side walls. In the installed state the open side of the channel is oriented towards the combustion chamber with which the piston is associated. In the expander spring there are provided circumferentially distributed slots 6 and 7 starting alternatingly in the radially outer side wall and the radially inner side wall and terminating in the radial base 8 in an overlapping relationship. This arrangement provides that the expander spring resiliently yields in the circumferential direction and may therefore be radially tensioned. The slots 6 and 7 are relatively wide to ensure satisfactory passage for the oil. The slots 7 subdivide the radially inner side wall of the channel into individual, radially inner resilient segments 10, the free ends 11 of which are bent outwardly with respect to the channel in such a manner that the leg segments 10 have an approximately S-shaped profile. As may be observed in FIG. 1a, in the installed condition the free ends 11 exert a radial and an axial spring force on the oil scraper ring 2.

The slots 6 subdivide the radially outer side wall of the channel into individual, radially outer leg segments 12 serving, in essence, for the axial support of the oil scraper ring 2. Each segment 12 has a portion 13 which connects the segment with the channel base 8 and which engages the wall 14 of the cylinder 3 at the crank shaft side of the oil scraper assembly. By virtue of the positive rounding of the portions 13, this zone of each segment 12 forms a gliding shoe which glides on the oil film at the cylinder wall 14 without any appreciable scraping effect, thus avoiding a premature wear of the expander spring. The engagement between the expander spring and the cylinder wall prevents the expander spring from canting in the piston groove which would adversely affect its operation. The radially outer leg segments 12 extend with a slight inclination inwardly (that is, towards the spreader ring axis) to provide for an axial resiliency. The free ends 15 of the leg segments 12 are radially inwardly bent and thus form a relatively large engagement face 16 for the oil scraper ring 2.

Figure 2A:
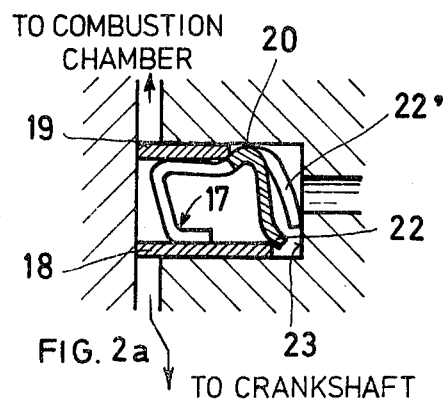
FIG. 2a is a cross-sectional view of an oil scraper ring assembly incorporating another preferred embodiment of the invention.
Figure 2B:
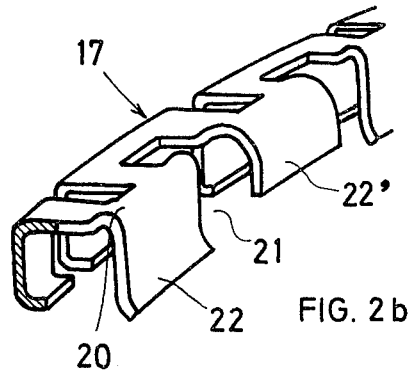

Turning now to the embodiment illustrated in FIGS. 2a and 2b, the expander spring 17 has a U-shaped cross section open towards the crank shaft as well as oil scraper rings 18 and 19 which are arranged at both radially extending sides (that is, the base and the open side) of the channel of the expander spring. The oil scraper ring 19 has a particularly small radial width and thus is capable of conforming in an improved manner to the shape of the cylinder wall 14. For supporting the oil scraper ring 19, the expander spring 17 has in the zone of the channel base, an axially outwardly oriented projection 20 which extends annularly and which is interrupted only by slots 21. Some of the radially inner leg segments constitute resilient tongues 22' which are bent radially towards the ring axis to such an extent that in the assembled state they engage the groove base 23 in the piston and thus center the entire scraper ring assembly.

Figure 3A:
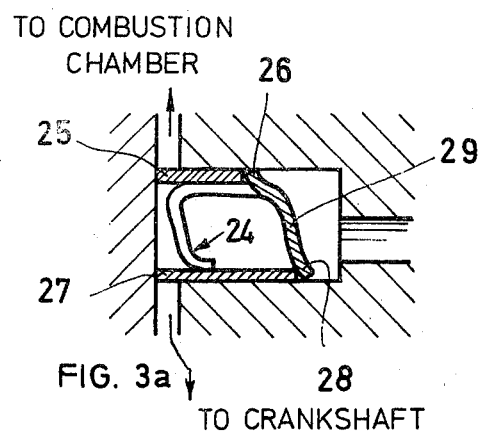
FIG. 3a is a cross-sectional view of an oil scraper ring assembly incorporating still another preferred embodiment of the invention.
Figure 3B:
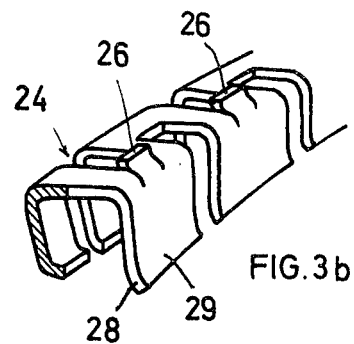

In the embodiment illustrated in FIGS. 3a and 3b the expander spring 24 has, for the radial support of the oil scraper ring 25 (oriented towards the combustion chamber), a plurality of support feet 26 which are bent, like tabs, axially outwardly from the radial base face. The feet 26, similarly to the projections 20 of the embodiment illustrated in FIGS. 3a and 3b, are situated along a circle of greater diameter than the free leg ends 28 of the leg segments 29 serving as support feet for the scraper ring 27 (oriented towards the crank shaft).

It will be understood that the above description of the present invention is susceptible to various modifications, changes and adaptations, and the same are intended to be comprehended within the meaning and range of equivalents of the appended claims.

What is claimed is:

1. In an oil scraper ring assembly positioned in a circumferential groove of a piston operating in a cylinder; the assembly including a sheet metal annular expander spring having an axis and forming an annular channel of generally U-shaped cross section, the channel having two side walls, a base interconnecting the side walls and an open side opposite the base, a plurality of circumferentially distributed slot means provided in the side walls for increasing the resiliency of the expander ring in the circumferential direction, and axially projecting support foot means extending from a radial side of the channel; the assembly further including at least one oil scraper ring being in sliding engagement with a wall of the cylinder and being supported by the expander spring and the support foot means thereof; the improvement wherein one side wall of said channel forms a radially inner, axially oriented side of said expander spring and the other side wall of said channel forms a radially outer, axially oriented side of said expander spring; said radially inner side having a free end formed as said support foot means.

2. An oil scraper ring assembly as defined in claim 1, further comprising a first series of radially oriented, circumferentially distributed slots starting at a free end of said one side wall of said channel and terminating in said base, said first series of slots dividing said one side wall into a plurality of radially inner segments; and a second series of radially oriented, circumferentially distributed slots starting at a free end of said other side wall of said channel and terminating in said base, said second series of slots dividing said other side wall into a plurality of radially outer segments each having a free end; the slots of said first and second series being in an alternating relationship in said base when viewed circumferentially; said first and second series of slots forming said slot means.

3. An oil scraper ring assembly as defined in claim 2, wherein said radially outer segments are arranged at an oblique orientation to said axis for positioning the free ends of said radially outer segments on a circle of reduced diameter.

4. An oil scraper ring assembly as defined in claim 2, wherein the free end of each said radially outer segment has a terminal portion bent to extend radially inwardly towards said axis.

5. An oil scraper ring assembly as defined in claim 2, wherein said radially inner segments have an S-shaped cross section.

6. An oil scraper ring assembly as defined in claim 2, wherein some of said radially inner segments extend radially inwardly to a greater extent than the remainder of said radially inner segments.

7. An oil scraper ring assembly as defined in claim 1, wherein said base of said channel carries, in the zone of the radially inner side of said expander spring, axial projections extending away from said channel, said axial projections forming said support foot means.

8. An oil scraper ring assembly as defined in claim 7, wherein said projections are formed of tab-like portions bent out of the base of said channel.

9. An oil scraper ring assembly as defined in claim 1, wherein the cylinder defines a combustion chamber and the piston is connected to a crank shaft and wherein there are provided first and second scraper rings arranged in the piston groove on opposite radial sides of said expander spring, said first oil scraper ring being oriented towards said combustion chamber and said second oil scraper ring being oriented towards said crank shaft; said first oil scraper ring having a radial width smaller than that of said second oil scraper ring; said support foot means comprising a first series of circumferentially distributed support feet carried on the radial side of said expander spring adjoining said first oil scraper ring and lying along a first circle and a second series of circumferentially distributed support feet carried on the radial side of said expander spring adjoining said second oil scraper ring and lying along a second circle; one of said series of support feet being formed by said free end of said radially inner side; the diameter of said first circle being larger than that of said second circle.

* * * * *